United States Patent

Avarbz et al.

[11] Patent Number: 5,876,787
[45] Date of Patent: Mar. 2, 1999

[54] PROCESS OF MANUFACTURING A POROUS CARBON MATERIAL AND A CAPACITOR HAVING THE SAME

[75] Inventors: Robert Gustavovitj Avarbz; Alla Vladilenovna Vartanova; Sergej Konstantinovitj Gordeev; Sergej Germanovitj Zjukov; Boris Aleksandrovitj Zelenov; Aleksandr Efimovitj Kravtjik; Viktor Petrovitj Kuznetsov; Julia Aleksandrovna Kukusjkina; Tatjana Vasilevna Mazaeva; Olga Sergeevna Pankina; Vasilij Vasilevitj Sokolov, all of St. Petersburg, Russian Federation

[73] Assignee: Alfar International, Ltd., Dublin, Ireland

[21] Appl. No.: 745,589

[22] Filed: Nov. 8, 1996

[51] Int. Cl.[6] .................................. B05D 5/12; B05D 7/00
[52] U.S. Cl. .......................... 427/79; 427/122; 427/126.1; 427/215; 427/219; 427/397.7
[58] Field of Search ................................ 427/58, 79, 115, 427/122, 126.1, 215, 219, 376.2, 397.7

[56] References Cited

U.S. PATENT DOCUMENTS

| | | | |
|---|---|---|---|
| 3,619,286 | 11/1971 | Gutnajer | 427/113 |
| 4,100,314 | 7/1978 | Wallouch | 427/402 |
| 5,147,590 | 9/1992 | Preidel et al. | 427/249 |
| 5,218,757 | 6/1993 | Kaneko et al. | 29/855 |
| 5,392,433 | 2/1995 | Kawakubo et al. | 428/408 |
| 5,402,306 | 3/1995 | Mayer et al. | |
| 5,702,839 | 12/1997 | Frost et al. | 429/42 |

FOREIGN PATENT DOCUMENTS

| | | |
|---|---|---|
| A 0 660 345 | 6/1995 | European Pat. Off. . |
| A02-297915 | 10/1990 | Japan . |
| 2026735 | 1/1995 | Russian Federation . |
| WO93/14511 | 7/1993 | WIPO . |
| WO95/06002 | 3/1995 | WIPO . |

*Primary Examiner*—Shrive Beck
*Assistant Examiner*—Bret Chen
*Attorney, Agent, or Firm*—Flehr Honbach Test Albritton & Herbert, LLP

[57] ABSTRACT

A process of manufacturing a porous carbon material and a capacitor having the same is provided. The process is comprised of: forming an intermediate blank (in the shape of a desired electrode) made of a metal carbide material having a porosity in the range of substantially 30% to 50% by volume. The blank is then impregnated by exposure to a gaseous hydrocarbon mixture at a temperature exceeding the decomposition of the hydrocarbon until the mass of the blank increases by about 10% to 25%. Next the inner surface of the blank is activated by heating. The blank is then exposed to gaseous chlorine and heated to remove the metal and form the blank having transport channels. Further chlorination occurs which forms nano sized pores in the structure. Thus, a porous carbon material is made which contains transport channels and nano sized pores.

24 Claims, 3 Drawing Sheets

5,876,787

PROCESS OF MANUFACTURING A POROUS CARBON MATERIAL AND A CAPACITOR HAVING THE SAME

RELATED APPLICATIONS

This patent application is related to Russian application number RU 95119733 and PCT application number PCT/EP96/00431, both of which are herein incorporated by reference.

FIELD OF THE INVENTION

The present invention relates to electric devices, and more specifically to capacitors with a double electric layer for accumulating construction for electricity, which can be used as short time or reserve source of electric current for radio electronic apparatus, memory units of personal computers, video, and many other devices. The invention also relates to a process of manufacturing a porous carbon material and a capacitor electrode having porous carbon materials.

BACKGROUND OF THE INVENTION

One of the main directions of the present development of high-efficiency capacitors with double electric layer is to make new electrode carbon materials with such a combination of properties as an optimal pore size, mechanical strength and high chemical purity.

Previously known are capacitors with a double electric layer (e.g., Japanese patent application No. 3-62296.1991), comprising two polarized electrodes divided by a separator, which are placed in a hermetic frame. The electrodes are made of active carbon and a binding agent, which consists of carbon black and ceramic powder. The electrode material has a porous structure, resulting in a specific electric capacitance not more than 25 F/cm$^3$.

The deficiencies of such capacitors include: considerable leakage currents due to a great content of ash in the electrode material (3–8%); large variation in capacitance characteristics due to changes in micro porosity properties of the electrode material in the process of manufacture of the electrodes and the capacitor assembly; and the electrode material has low mechanical strength (this limits the use of these capacitors in constructions, which are working under conditions of high mechanical stress, e.g., vibrations).

Further, previously known (Japanese patent application No. 1-165108.1989r) are capacitors with double electric layer, comprising a frame of stainless steel; the frame comprises a bottom and a lid joined by a washer creating a hermetic container. In the frame, two polarized electrodes, saturated with electrolyte and separated by a porous separator, are situated. The electrodes are made of active carbon (80% mass) and a binding agent, which consists of ash (10% mass) and polytetrafluorethylene (10% mass). The material in the form of paste is applied to an electrically conductive underlayer and is then rolled and dried. From the resulting sheet product and the prescribed size electrodes are cut.

Such capacitors can operate over a wide range of temperatures. The electrode material provides the maximum specific electric capacitance within the limits of 20–25 F/cm$^3$. However, these capacitors have all the deficiencies of the preceding ones.

For more than ten years new types of high energy capacitors have been developed based on very fine grained transmission metal oxides, like ruthenium oxide on a titanium foil, and these electrodes have been named super or ultra capacitors. High surface area carbons have also been used as electrode materials. Activated carbons with surface areas of a thousand or more square meters per gram are well known and results in super capacitors of coin size holding capacitances of several Farads.

For good performance as electrode materials it is desirable that these carbons high surface area. However, it is also important that a carbon electrode be stable in the electrolyte over the used capacitor voltage range, have high purity to minimize discharge or current leaks during long-time use and the specific electrical conductivity within the electrode must be high.

SUMMARY OF THE INVENTION

Accordingly, it is an object of the present invention to provide a capacitor which exhibits a simultaneous increase in capacitor specific electric capacitance, decreased variation of the actual capacitance values and decreased leakage currents.

Another object of the present invention is to provide a capacitor with an increase in electrode strength and mechanical stability. This will allow an extension of the field of use for the capacitors, for example to constructions working under conditions of mechanical impact or vibration.

A further object of the present invention is to provide an electrode having a carbon skeleton structure containing a network pores having nano-porosity and transport channels having micro-porosity.

Another object of the prevent invention is to provide a method of manufacturing a capacitor electrode using a chemothermal process.

Yet another object of the present invention is to provide a method of manufacturing a porous carbon material.

These and other objects are achieved by the capacitor of the present invention having a double electric layer, placed within a hermetic housing in which at least two electrodes are situated and wherein the electrodes are comprised of a carbon material having formed therein a solid carbon skeleton network and a plurality of nano-sized pores, and a plurality of micro-sized pores forming a plurality of transport channels. In an exemplary embodiment, the electrodes are formed by a structure made of material with carbon content more than 95% mass, preferably more than 99% mass. The material has a total volume preferably in the range from 55% to 70% of the electrode pore volume, the volumes of pores with nanopore sizes is less than 10 nm and is preferably in the range of 35% to 50% of the electrode pore volume; and the micro-pore size is greater than 100 nm and is preferably in the range of 15%–30% of the electrode pore volume. Such a structure provides a high electric capacitance.

In another embodiment of the present invention, a method is provided for manufacturing a porous carbon material and a capacitor having a porous electrode material. In an exemplary embodiment the method is summarized by the following steps: forming in the shape of said electrode an intermediate blank made of a metal carbide material having a porosity in the range of substantially 30% to 50% by volume. The blank is them impregnated by exposure to a gaseous hydrocarbon mixture at a temperature exceeding decomposition of said hydrocarbon mixture until the mass of said intermediate blank increases by substantially 10% to 25%. The inner surface of the blank is then activated by heating. The blank is then exposed to gaseous chlorine and heated wherein the metal is removed forming the blank leaving transport channels, and further chlorination occurs which forms pores of nanoporosity.

In an alternative embodiment, the blank is made from silicon carbide and may be saturated liquid silicon wherein the hydrocarbon mixture interacts with the liquid silicon to form a secondary silicon carbide structure throughout said blank, with free silicon filling cavities in the blank.

Thus, these electrode properties are obtained by means of a special chemothermal treatment of a silicon carbon or metal carbide composite. After such a treatment, the electrode contains practically pure carbon with a ramified system of transport channels and a nanoporosity, and only minor amounts of impurities (less than 5% mass, preferably less than 1% mass). These electrodes have a carbon structure providing high electrode mechanical strength (compressive strength more than 90 kg/cm$^2$). The material consists of a solid skeleton of carbon interconnected throughout the structure, resulting in mechanical rigidity and strength, and a combination of coarse sized transport channels/pores of the electrolyte and nano sized porosity, together making up the total porosity volume. Of importance is also the stability of the electrode dimensions and its pores and, as a result, a stability of the electrode electrical properties. Thus, the decrease in height and diameter values from intermediate product to finished electrode is not more than 0.05% permitting a very limited variation in electrode specific electric capacitance, resulting in actual capacitor capacitance in the range ±15%, whereas known capacitors have the electric capacitance tolerance +80% to −20%.

The new electrodes offer an increase in specific electric capacitance and actual capacitor capacitance by nearly 30% in comparison with known technical solutions and a decrease in leakage currents of 5–10 times because of an only minor impurity content of the carbon material. In addition, the high electrode strength makes it possible to use the capacitors in devices working under vibration, impact and other mechanical stresses.

BRIEF DESCRIPTION OF THE DRAWINGS

Other objects and advantages of the invention will become apparent upon reading of the detailed description of the invention and the appended claims provided below, and upon reference to the drawings in which:

DETAILED DESCRIPTION OF A PREFERRED EMBODIMENT

Figure 1:
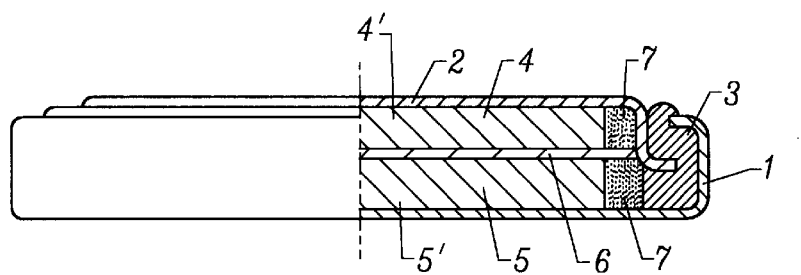
FIG. 1 is a side view, partially cut away of a capacitor with a double electrode layer in accordance with the present invention.

The invention will now be described in more detail with reference to exemplifying embodiments thereof and also with reference to the accompanying drawing, in which in FIG. 1 illustrates a side view, partially broken away of a capacitor in accordance with the present invention.

The capacitor with a double electric layer generally includes a hermetic frame, having a bottom surface 1 and a lid 2, joined by a dielectric washer 3. Inside of the frame two electrodes 4 and 5 are situated. The electrodes 4 and 5 are saturated with an electrolyte and separated by means of a porous separator 6. One surface of each electrode 4' and 5' of the double electrode layer are in contact with the bottom surface 1 and the lid 2, respectively. To simplify assembly of the capacitor, there are elastic washers 7 encircling the periphery of the electrodes 4 and 5.

The double layer capacitor as shown stores energy by charge separation in the double layer formed at the liquid electrolyte-solid interface. The liquid electrolyte is impregnated into the porous electrode material and the access to a large surface area by a uniform wetting of the pores is important. Of particular advance, the electrodes are comprised of a solid carbon skeleton structure having two different pore structures. Specifically, the electrode includes a combination of nano-sized pores, and micro-sized pores which form transport channels. The electrode material is comprised of carbon with a carbon content of greater than 95% by mass, and preferably greater than 99% by mass. The electrode material has a total pore volume preferably in the range of substantially 55% to 70% by volume. Of this total pore volume, in the preferred embodiment, the volume of nano-sized pores will be substantially in the range of 35% to 50%, and the volume of the micro-sized pores will be substantially in the range of 15% to 30%. The nano-sized pores are less than 10 nm in size, and the micro-sized pores are greater than 100 nm in size. In an alternative embodiment, at least 50% of the nano-sized pores having a size less than 10 nm, have a size less than 2 nm.

Of further advantage, the present invention provides for a method of producing the capacitor electrode structure described above. Specifically, according to one embodiment of the present invention, the electrodes are formed from a blank of desired size, containing silicon carbide powder with particles of a size substantially in the range of 5 to 40 micrometers, with porosity of 30–50% volume is molded thereby pressing or another known process, e.g., a slurry casting or slip casting. If necessary, a temporary binder is used, such as a 10% volume water solution of polyvinyl alcohol. Alternatively, the silicon carbide powder may contain silicon carbide fibers as opposed to silicon carbide particles, or a mixture of both fibers and particles. Alternatively, instead of silicon carbide fibers, carbon fibers and a mixture of silicon carbide particles may be used.

Of particular importance the blank contains a porosity volume substantially in the range 30% to 50%. Control of the nano-sized porosity in the final electrode depends on the silicon content in the blank. In the case where the porosity level is more than 50%, the electrode material will have low durability. In the case where the porosity is less than 30%, problems will occur with saturation.

Next, the carbide semiproduct blank is impregnated with pyrocarbon by heterogeneous chemical synthesis of carbon from gaseous medium as a result of chemical carbon decomposition. At a temperature range of 700° C. to 1000° C., low molecular carbons (such as methane, ethane, propane, acetylene, benzene, and the like) are able to undergo chemical reactions of decomposition according to the following reaction:

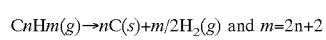

$$C_nH_m(g) \rightarrow nC(s) + m/2H_2(g) \text{ and } m=2n+2$$

where n is preferably an integer from 1 to 10.

Flow of the reaction of silicon carbide materials within blank volume brings uniform carbon deposition on the interior surface of blank. Preferably, pyrocarbon impregnation is carried out by heat treatment at a temperature in the range substantially of 700° C. to 800° C. for a period of 10 to 20 hours. Synthesis is carried out until the mass of the blank is increased by 10% to 25%, and preferably by 15% to 20%. At higher content of pyrocarbon in the blank, one cannot get the needed value of the micro-sized pores (transport channels) upon the following states of molding, and if the increase in the blank mass is less than 10%, the solid skeleton of secondary silicon carbide obtained from further processing stages will become shaped with some defects that impact the final durability properties of the electrode.

The inner surface of the blank is activated by means of heat treatment at a temperature substantially in the range of 1450° C. to 1700° C. after molding and pyrocarbon impregnation. Activation improves liquid silicon interpenetration during the next method step. Surface activation at lower temperatures does not occur fully.

The blank is placed in a vacuum furnace where it is saturated by liquid silicon at a temperature range of 1500° C. to 1700° C. During this process, a chemical intercalation of liquid silicon and carbon (carbon black or pyrocarbon) with formation of secondary silicon carbide takes place. This secondary silicon carbide forms a continuous structure throughout the entire volume of the blank, bonding the grains of initial silicon carbide and forming a solid silicon carbide body with residual pores filled with silicon metal. Reaction of silicon carbide formation at a temperature lower than 1500° C. does not occur, so the purpose of the method is not achieved. Silicon begins to evaporate in the vacuum furnace at temperatures above 1700° C.

Thus, a porous-less blank, comprising silicon carbide particles, bonded by a structure of secondary silicon carbide and free silicon, is obtained. The blank is then subjected to heat treatment with chlorine at a temperature in the range of substantially 900° C. to 1100° C. During chlorination, the free silicon is removed from the blank in the form of gaseous silicon chloride and thus a necessary volume of transport micro porosity channels/pores are formed. In addition, as a result of silicon carbide chlorination, carbon with a developed nanoporous structure is formed in the reaction:

$$SiC(s) + 2Cl_2(g) \rightarrow C(s) + SiCl_4(g)$$

The combination of transport channels/micropores having a size more than 100 nm and nanoporosity of the resulting solid skeleton carbon network is of great importance because it facilitates electrolyte access to the available large internal electrode surfaces made up by the nanopores' walls. The solid continuous skeleton carbon network also provides low internal electric resistance.

In an alternative embodiment of the present invention the method of manufacturing a porous electrode material is performed without the infiltrating step of liquid silicon. For example, a blank may be formed from a mixture of TiC particles and a binding agent. Preferably, the TiC particles are comprised of a mixture of particles such that 70% by weight of such particles have a size of approximately 40 microns, and 30% by weight of such particles have a size of approximately 3 microns. Preferably, the binding agent is comprised of a 10% by weight solution of 10% phenolic resin and 90% $C_2H_5OH$. This mixture is then molded, such as in a hydraulic press with a molding pressure of about 300 kg/cm$^2$. This results in a blank with a porosity of approximately 40% by volume. Thereafter the blank is placed in a flow of natural gas having a temperature of about 900° C. The blank remains in this flow until the weight of the blank increases preferably by about 10%. Next the blank is exposed to a flow of chlorine gas at a temperature of about 600° C. thereby removing Ti from the blank and leaving a solid carbon skeleton structure with a plurality of pores.

The porous electrode material produced by this method will generally have a total porosity volume of 60%, with a nano-sized porosity of 33% and a micro-sized porosity ( i.e. transport channels) of 27%. The electrode exhibits a specific surface area of 700 m$^2$/cm$^3$, and a capacitance of 25 F/cm$^3$. This material has a greater content of transport channels than electrodes produced in the liquid infiltrating embodiment, and this is advantageous for certain application, such as high-current applications.

According to a preferred embodiment, the electrodes are produced from silicon carbide powder with a 30–50% volume porosity. Then pyrocarbon is impregnated into the blank by chemothermal treatment in the medium of gaseous hydrocarbon or hydrocarbon mixtures, with temperatures above the level of thermal decomposition, until the weight of the blank increases by 15% to 25%. Then activation of the inner surface of the blank is made by heat treatment at temperatures in the range of 1450°–1700° C. Then the blank is impregnated by liquid silicon at temperatures in the range of 1500°–1700° C. Thereafter the sample is treated with chlorine gas ($Cl_2$) at 900°–1100° C. temperature.

The capacitors and electrode materials of the present invention were subjected to numerous tests. For confirmation of the obtained technical result 12 pieces of carbon electrodes (diameter 19.5 mm, height 1.0 mm) and 6 pieces of button like capacitors (diameter 24.5 mm, height 2.2 mm) were manufactured. A separator of porous polypropylene with ionic conductivity was used, and an electrolyte of an aqueous solution of alkali, KOH was used. The nominal electric capacitance of the capacitor was 20 F and the voltage was 1.0 volt, which allows for the required ionic transport.

The physical and mechanical properties of the electrode material were investigated and capacitors were tested for reliability to work under actual conditions as a power source for electronic watches and electronic memory units for personal computers. The tests for reliability were carried out at the voltage 0.9±0.1 V at a temperature 70°±5° C. The test duration was 500 hours.

Figure 2:
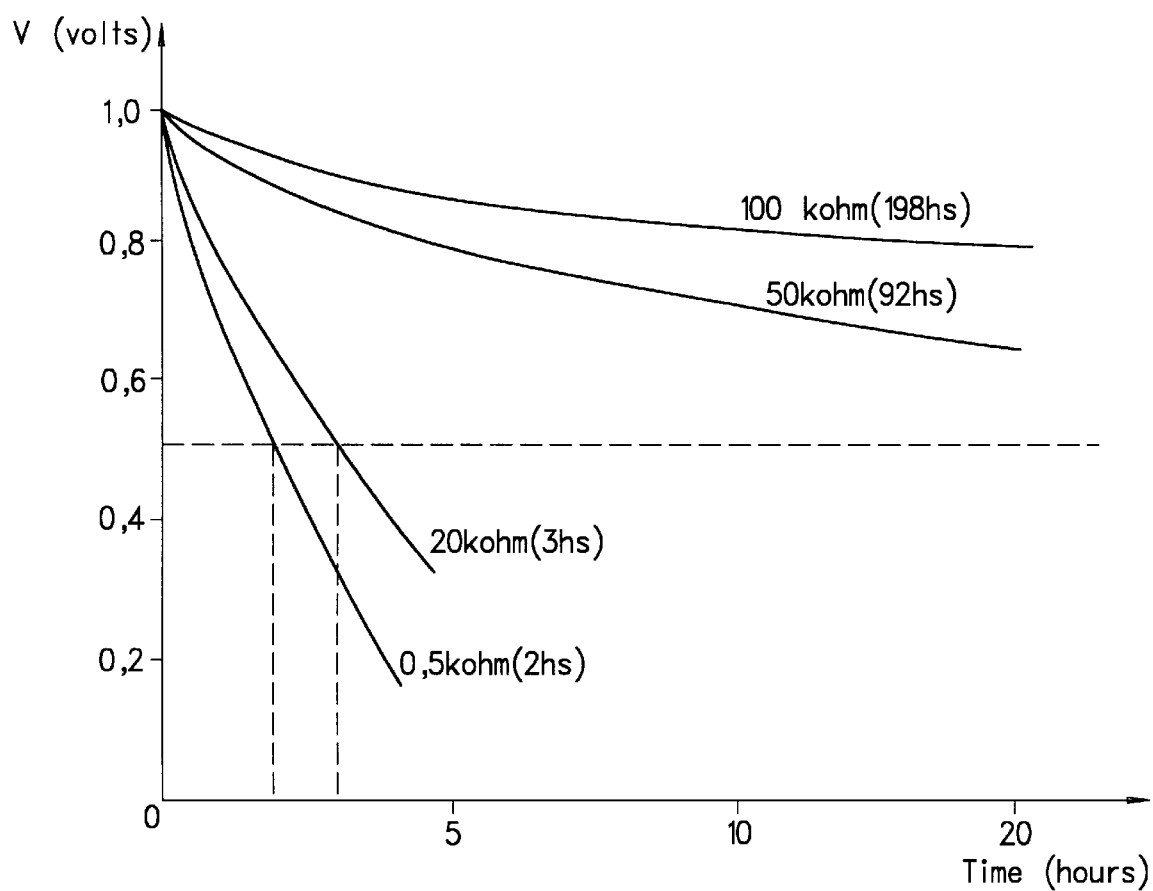
FIG. 2 is a graph depicting the voltage across a load as a function of discharge time of a capacitor in accordance with the present invention.

The investigation results of the electrodes physical, chemical and mechanical properties and of the capacitor tests are given in Tables 1 and 2 and by the graphs illustrated in FIG. 2.

TABLE 1

Test results of electrode material

| Electrodes No. | Total pores volume in electrodes (volume %) | Volume of pores with sizes less than 10 nm (%) | Specific capacitance (F/cm$^3$) | Compressive strength (kg/cm$^2$) | Carbon content (% mass) |
|---|---|---|---|---|---|
| 1 | 55 | 45 | 35 | 95 | 99.1 |
| 2 | 70 | 40 | 30 | 99 | 99.2 |
| 3 | 65 | 50 | 39 | 94 | 99.3 |

TABLE 2

Test results of manufactured capacitors

| Capacitors No. | Before test Actual capacitance Co (F) | After test Resistance Ro, Ohm | Actual capacitance C1 (F) | Resistance R1 (Ohm) | $\frac{C_o-C_1}{C_o} \times 100$ (%) | $\frac{R_1-R_o}{R_1} \times 100$ (%) |
|---|---|---|---|---|---|---|
| 1 | 19   | 0.3  | 17.8 | 0.35 | 6.3 | 16.6 |
| 2 | 20   | 0.25 | 18.6 | 0.3  | 7.0 | 20.0 |
| 3 | 19.5 | 0.35 | 18.0 | 0.4  | 7.6 | 14.3 |
| 4 | 18.5 | 0.25 | 18.0 | 0.3  | 2.8 | 20.0 |
| 5 | 18.0 | 0.3  | 17.0 | 0.35 | 5.6 | 16.6 |
| 6 | 19.5 | 0.25 | 18.5 | 0.3  | 5.1 | 20.0 |

In Table 1 the results of an analysis of electrode investigation are illustrated. As shown, the volume of pores with a size less than 10 nm (average 43% of electrode volume) is nearly twice that of conventional carbon electrodes manufactured by means of traditional technology including unit molding from silicon powder by pressing of paste which consists of silicon carbide powder and industrial synthetic resins as a binder, following heat treatment with temperatures required for hardening the resin and chlorination with temperatures about 1000° C. (as discussed by K. S. Breslavets, V. S. Kogan, V. G. Kolobrodov, G. K. Ivahniuk and others who have used carbon tubular products in cryo-absorption pumps. "CARBON ABSORBENTS AND ITS INDUSTRIAL APPLICATION" Moscow, Science, 1983, pp. 243).

Additionally, the compressive strength of the electrodes have increased more than 3 times that of conventional electrodes formed by traditional techniques. Moreover, the specific electric capacitance (average: 34. 5 F/cm³) exceeds by nearly 30% the specific capacitance of known carbon materials (which are not more than 25 F/cm³).

Table 2 depicts test reliability results and shows only slight variation in the normal capacitor capacitance (±5.3%). The explanation for this is the high mechanical strength of the carbon electrodes, having a stable ramified structure, maintaining geometrical and electrode parameters during the assembly process. After the test, the capacity loss was 5.7% (average) and increase in inner resistance was 18% (average), satisfying high performance demands.

Turning to FIG. 2 the results of the capacitor tests are shown. The tests were performed under the following conditions: duration of the performance of capacitors as a current source was 198 hours at the load 100 kohm, 32 hours at the load of 50 kohm, 3 hours at the load of 20 kohm, and 2 hours at the load of 0,5 kohm. These conditions imitate the real discharge of capacitors in operation under load in various devices, where the capacitor may be used as a power source.

Further testing was performed on additional electrodes produced according the method of the present invention. The true density of the carbon material measured by helium absorption was found to be ~2.20 g/cm³ which is acceptable close to the theoretical density of a well ordered graphite crystal being 2.25 g/cm³. However, the apparent density using measurements of size and weight of the carbon electrodes was 0.85 g/cm³ implying a total pore volume of 0.70 cm³/g in the body.

The first results by mercury and gas porosymmetry indicated that the porosity in the skeleton carbon divided mainly into two groups. Therefore, in this portion of the discussion of the porosimetry results, the pore sizes <10 nm, and more specifically less than 2 nm, are named nano pores, whereas the pores larger than 50 nm (0.05 μm) are called micro pores below. (However, earlier, micropores were classified as containing pores of a size greater than 100 nm) Less porosity was observed in the range of 2–50 nm, named meso pores.

The use of mercury intrusion porosimetry was mainly used to characterize the pore size distribution of the micro porosity (less 50 nm). The total micro pore volume was found to be ~0.2 cm³/g (corresponding to a surface area ~25 m²/g). Pores corresponding to the submicron interval 0.05–0.2 μm was around 25%. The majority, around 60%, came from porosity in the interval 0.2–2 μm and less pores (4%) was in the porosity interval 2–50 μm. Finally, a group of larger pores (11%) were registered in 50–100 μm size range. Pores of the latter size were never seen by microscopy of cross-sections implying that they in fact represent surface irregularities.

The surface area measured by separate BET equipment and that calculated from multipoint BET fit of data from the gas porosymmetry gave similar results with a value around 1200 m²/g. In this material, however, most of the porosity is found in very narrow pores and a more true value might be achieved by using the Langmuir model that was developed for the case of mono layer absorption. In view of the intense potential fields in a very narrow pores, it would in practice be difficult to determine if the mechanism by which the pores fill is that of absorption to some extent. Using a multi-point fit of the gas porosimetry data to the Langmuir equation gives the surface area 1390 m²/g.

Figure 3:
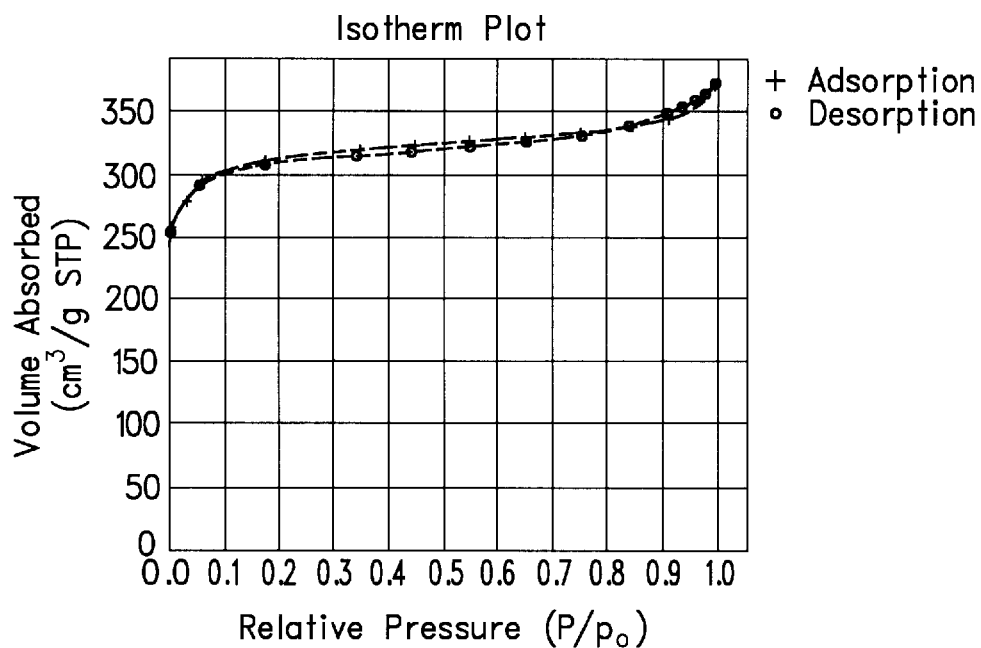
FIG. 3 illustrates an isotherm plot obtained from gas porosity measurements of carbon electrode materials in accordance with the present invention.

The gas porosimetry showed that not only the major part of the surface area came from nano-sized pores (of pore size 2 nm ), but also that the volume of these pores were 0.45 cm³/g. This is approximately 60% of the total porosity of the skeleton carbon material and the very distinct porosity distribution can be observed in the plots from the gas porosimetry measurements in FIG. 3. FIG. 3 is an isotherm plot obtained from gas porosity measurements taken from a 0.09 g sample of skeleton carbon material. Note the very steep raise in the absorbed gas volume indicating that the major part of porosity is from nano-sized porosity, and more specifically, nano pores of a size of less than 2 nm. By using Horvath-Kawazoe differential pore volume plots it is found that most nanoporosity is centered close to one single pore size and depending on our assumption of the pore shaped, like cylindrical or slit-like pores, this value varies in the interval 0.4–1.2 nm.

Figure 4A:
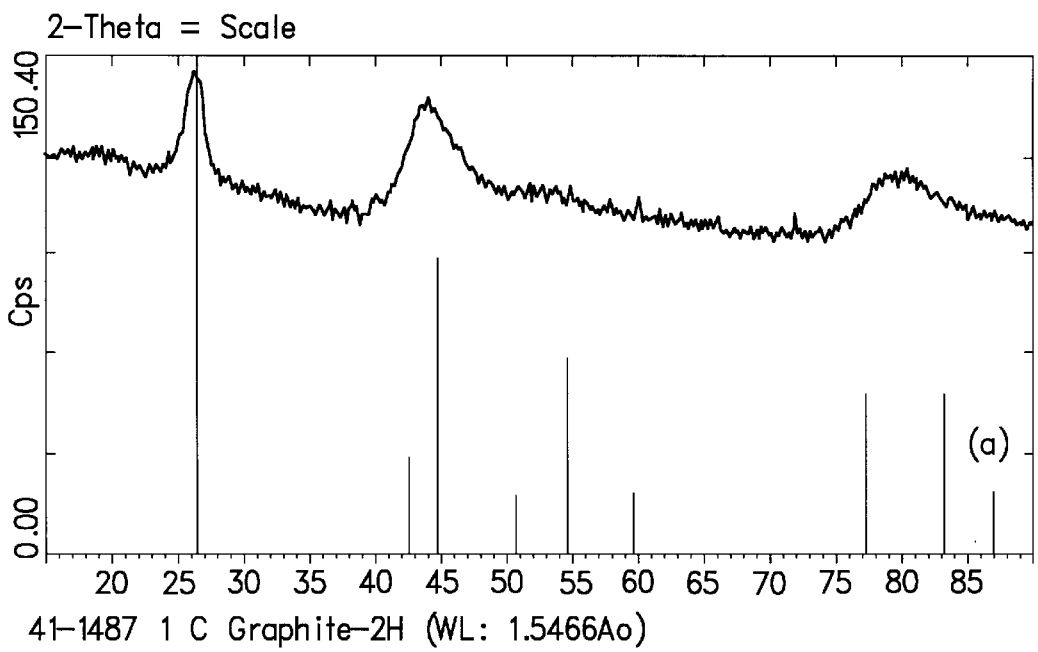
FIGS. 4a and 4b represent XRD spectra of carbon electrode materials measured by by grazing angle measurement in figure a, and by standard equipment in figure b.
Figure 4B:
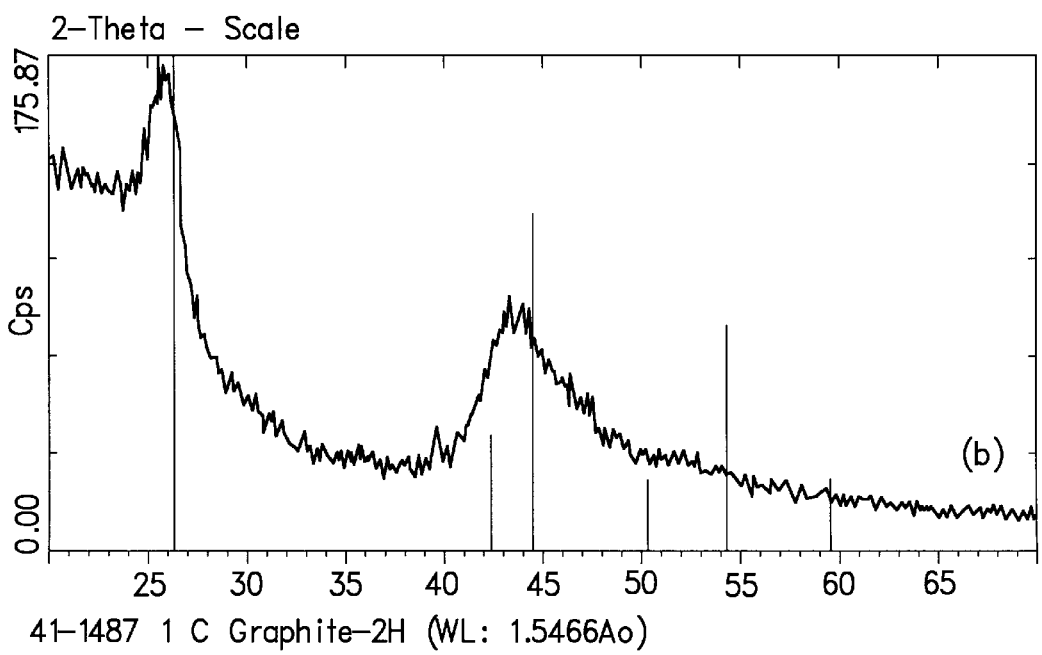

X-ray diffraction were measured directly on the flat electrode surface both by standard diffractometry as shown in FIG. 4a, and by grazing angle diffractometry, as shown in FIG. 4b. By polishing away material, no difference was seen in the subsequent XRD recordings of the bulk of the discs and the electrodes are homogeneous in this respect. The similarity of the standard XRD, with much deeper information depth of the x-rays, and the grazing angle XRD technique also implies a similarity of the outer surface zone and the interior.

The only phase that could be identified in a highly disordered state was graphite giving broad peaks of very low intensity. No three-dimensional order seem to occur, although a limited order of sections of parallel graphite layers in the atomic structure occur (turbostratic). The observed spacing of the (002-reflection (2Θ–26°) found at 0.346 nm is greater than that of a perfectly ordered graphite structure (0.3354 nm) implying little long-range stacking order has occurred. This value, however, is closer to graphite than those reported for typical carbon blacks ($d_{002}$= 0.35–0.36) suggesting a higher degree of graphitization, which normally is found by heating carbon black to extreme temperatures (>>2000° C.). The size of ordered domains can be estimated from the peak width at half maximum and indicates that these are larger than for typical carbon black.

The microstructure was characterized by SEM of fractured cross-sections of the inventive electrodes. The electrode structure was found to contain large grains of carbon with a size corresponding to the starting material, typically 5–30 μm. When one of these large grains fractured it gave a flat cleavage surface discussed below. Between the large grains much smaller carbon grains were found interconnecting the large grains. The micro sized pore structure forming continuous transport channels was controlled by the spaces left between the original large grains. Some parts were of course filled with the secondary reacted smaller particles but enough space is present for the electrolyte and measurement by mercury porosimetry indicated that these had a maximum around 1 micron size.

The fractured surfaces of the larger grains appear "graphite-like", thus splitting in a flake line manner. The fractured surface is large and flat and flakes of step wise showing that weak bonds are extended in an ordered manner over large distances, but the material is stronger in the two-dimensional plane parallel to the fracture (like graphite). The other feature is the agglomerates of smaller carbon grains reacted to each other but also to the surfaces of the larger grains. The most important detail is that the contacts between these are close and seem not to break easily as in many cases the larger grains fracture rather than agglomerates breaks or get loose from a larger grains surface.

In the SEM investigation different parts of the microstructure were analyzed with the energy dispersive spectrometer (EDS) as well as overall analysis were made on larger surfaces. The overall carbon content was found to be >99.6%, but some variation was seen in the distribution of impurities. The analysis of larger surfaces showed that the major impurity was sulphur (0.3–0.4%) and some trace of silicon was also present. However, analysis of fractured surfaces of the large grains revealed that they were fairly pure with only some small amount of sulphur (~0.2%) present. The highest concentration of impurities was found in the aggregates of small crystals forming the connections between the larger grains. All silicon was found here as well, but fairly unevenly distributed. This implies that the greatest source of impurity is the organic precursor thermally decomposed to form these intergranular contacts.

The skeleton carbon material of the present invention gives the material some desirable mechanical strength, which provides particular advantages in preparation of thin electrodes and the handling of electrodes in general.

Figure 5:
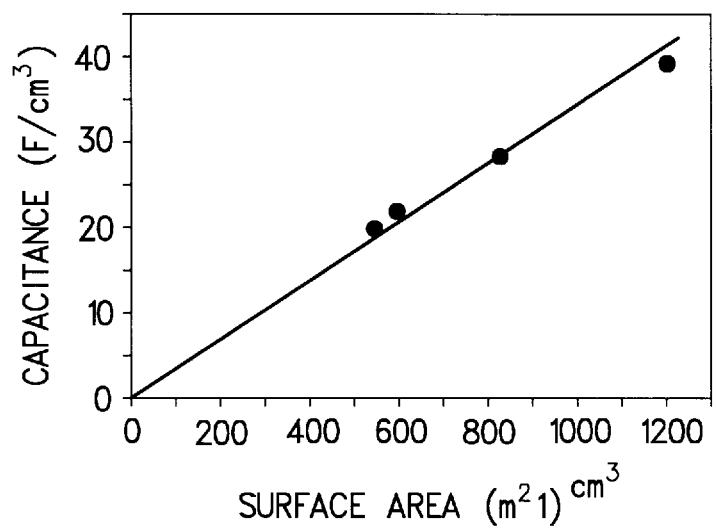
FIG. 5 is a graph showing measured capacitances of electrodes employing skeleton carbons of varying surface area in a 25% KOH-water solution.

Of particular advantage the present invention provides that by changing the grain size distribution of the carbon precursor material and the process parameters, skeleton carbon electrode materials are produced that exhibit a range of surface area. Specifically, surface areas ranging form 550 to 1250 $m^2/cm^3$ were obtained. Electrode materials made from different carbon batches were tested and show a linear increase in capacitance as a function of surface area as shown in FIG. 5.

A comparative study of water and organic based electrolytes using skeleton carbon electrodes in a capacitor according to the present invention and a conventional K58-4 carbon fiber type electrode was performed. The results are shown in Table 3, with the inventive electrode being abbreviated as "Inv." under the Type category. The inventive electrode and method produce superior results as compared to conventional electrodes.

TABLE 3

| Type | Electrode | Electrolyte | Capacitance (per cell) | Voltage (V) | Energy in Capac. F/cm³ | J/cm³ |
|---|---|---|---|---|---|---|
| Ref. | C-fiber | Organic | 3.3 | 2.5 | 3.3 | 10.0 |
| Inv. | Skeleton | KOH | 22.0 | 1.0 | 22.0 | 11.0 |
| Inv. | Skeleton | Organic | 6.8 | 3.0 | 6.8 | 30.0 |

The following example elucidates the essence of the present invention.

EXAMPLE

A blank in the form of a plate, having a diameter of 19.5 mm, and a height of 1 mm, containing silicon carbide powder having particle dimension of 40 mcm, with 10% water solution of polyvinyl alcohol as a temporary binder, is molded by a hydraulic press. The molding pressure is 300±10 kg(f)/sq.cm. to obtain a blank of desired dimensions with 40% volume porosity. In order to harden the temporary binder, the blank is heated to 150° C.±10° C. for a period of 5 hours, and then cooled to room temperature. The following synthesis of pyrocarbon is carried out in an installation comprising a continuous type reactor, a system for preparation and delivery of reagents, an electric power supply system and instrumentation. The continuous type reactor in which the blank is placed is manufactured of quartz glass and heated by means of resistor furnace. For synthesis of pyrocarbon, a predetermined flow rate of gaseous hydrocarbon is established, then the reactor is heated to a temperature beyond the temperature of thermal decomposition of the hydrocarbon. When using natural gas, the preferred temperature is 880°–900° C. The specimen is held for a period of 20 hours in order to increase the weight of the blank by 15%. Cooling takes place in ambient air. Then the plate is placed in the furnace of a tightly closed installation such as a (REDMET-8) and evacuated to a pressure of 1 Pa. The furnace is heated directly by passing electric current through graphite heater to the temperature of 1550° C., and the blank is heated for a period of 15 minutes, and then the furnace is cooled down to room temperature. Next silicon is placed on the surface of the blank, and heated to 1600° C. for a period of 15 to 20 minutes, whereby liquid silicon fills pores of the blank and interacts with the pyrocarbon to form secondary silicon carbide. Excessive silicon locates in the remaining cavities. After cooling of the furnace, the specimens of carbide semiproduct blanks are extracted.

Next, synthesis of nanoporous material is carried out by processing of the blanks in chlorine gas flow at a temperature of 1000°±10° C. in an installation comprising a quartz reactor with resistor furnace, a system for delivery of chlorine and nitrogen, electric power supply system and a system for absorption of reaction products and excessive reagents. Nitrogen is used for blow-through of the system to evacuate residual quantities of reagents and products of reaction.

Realization of the described method for obtaining of the material is possible also with change of said parameters within the scope characterizing essence of the present invention.

The electrode material produced according to this example has been used as electrode material for manufacturing of capacitors having properties presented below. Apparent density and total volume of pores are determined by hydrostatic weighing method according to GOST 473. 4-81, wherein specimens are saturated with water and their mass is determined in the air and water. The total volume of pores is calculated as:

$$V = \overset{m}{\Sigma}\ (m\ \text{wet} - m\ \text{dry})/(m\ \text{wet} - m)$$

where:

m wet=mass of the specimen saturated with water, g;

m dry=mass of the dry specimen, g;

m=mass of weights balancing the specimen saturated with water when weighing it in the water, g.

Actual density is determined by a gas pycnometry method based on measurement of volume of a gas (helium) displaced by the specimen out of the measuring chamber, precedently calibrated. Measurements are carried out with a Autopicnometre 1320 instrument. The volume of transport pores is determined by gas pycnometry method using a Sorbtomatic 1800 instrument. Determination of volume of nanopores is carried out by measurement of benzene absorption in saturation conditions.

Specimens are placed in exiccator with benzene and held until a constant mass is obtained. Volume of absorption space is calculated as:

$$Ws=(m\ f-m\ i)/g\ (C6H6),$$

where m i=initial mass of the specimen, g;

m f=mass of the specimen saturated with benzene, g;

g C6H6=benzene density, g/cu.cm.

Properties of high-resistance capacitors based on compact nanoporous carbon materials were studied with a disk-type capacitor comprising two electrodes, having a diameter of 18.5 mm and height of 1 mm, manufactured of compact nanoporous materials, according to the method described above. Specific capacitance was measured in an electrolyte, namely, a 38% solution of sulphuric acid.

At measurements, total electrolytic capacitance of the system C=(Cc×Ca)/(Cc+Ca) was related to carbon material volume (cathode+anode). The obtained electro-chemical characteristics of the capacitor are presented in Table 1. The nanoporous material is characterized with the following parameters:

| apparent density, g/cu · cm | 0,7–0,87 |
| total volume of pores, % volume | 55–70 |
| volume of nanopores, % volume | 35–50 |
| volume of transport pores, % volume | 15–30 |
| total carbon, % volume | more than 99 |

The function of the capacitor according to the invention should be apparent from the specification given above. The capacitor according to the invention offers considerable advantages compared to previously known techniques as described in the introductory part of the specification. The invention has been described with reference to an exemplifying embodiment. It will be understood, however, that other embodiments are conceivable without departing from the inventive concept. For example, more than two electrodes may be provided in the capacitor. Additionally, another example might be the use of aluminum carbide and aluminum metal which lowers the needed reaction temperatures significantly in one method step of the invention. Metal carbides based on Ti and other metals of Group IV, V and VI of the periodic table might also be used where gaseous halogens are formed, like fluorides and chlorides.

The foregoing description of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the Claims appended hereto and their equivalents.

We claim:

1. A method of manufacturing an electrode material having a solid carbon skeleton network with a plurality of pores, and a plurality of transport channels, comprising the steps of:

forming in the shape of said electrode an intermediate blank made of silicon carbide material having a porosity in the range of substantially 30% to 50% by volume;

impregnating said intermediate blank with a pyrocarbon by exposure to a gaseous hydrocarbon mixture at a temperature exceeding decomposition of said gaseous hydrocarbon mixture until the mass of said intermediate blank increases by substantially 10% to 25%;

activating the inner surface of said intermediate blank by heating said blank to a temperature substantially in the range of 1450° C. to 1700° C.;

saturating said intermediate blank with liquid silicon wherein said pyrocarbon interacts with said liquid silicon to form a secondary silicon carbide structure throughout said blank, with free silicon filling cavities in said blank; and exposing said blank to gaseous chlorine at a temperature in the range of substantially 900° C. to 1100° C.; wherein the free silicon is removed forming a plurality of transport channels, and the silicon carbide undergoes chlorination which forms a plurality of pores.

2. The method of claim 1 wherein the step of activating further comprises heating said blank in an inert atmosphere.

3. The method of claim 1 wherein the step of activating further comprises heating said blank in a vacuum.

4. The method of claim 1 wherein the step of saturating occurs at a temperature in the range of substantially 1500° C. to 1700° C.

5. The method of claim 1 wherein said intermediate blank is formed by pressing.

6. The method of claim 1 wherein said intermediate blank is formed by slurry casting.

7. The method of claim 1 wherein said intermediate blank is formed by slip casting.

8. The method of claim 1 wherein said silicon carbide material comprises silicon carbide particles having a size in the range of substantially of 5 to 40 micrometer.

9. The method of claim 1 wherein said silicon carbide material comprises silicon carbide fibers.

10. The method of claim 1 wherein said silicon carbide material comprises a mixture of silicon carbide fibers and particles.

11. The method of claim 1 wherein said silicon carbide material comprises a mixture of carbon fibers and silicon carbide particles.

12. A method of manufacturing an electrode material having a solid carbon skeleton network with a plurality of pores, and a plurality of transport channels, comprising the steps of:

forming in the shape of said electrode, an intermediate blank made of carbide material and a binding agent;

impregnating said intermediate blank with a pyrocarbon by exposure to a gaseous hydrocarbon mixture at a temperature exceeding decomposition of said gaseous hydrocarbon mixture until the mass of said intermediate blank increases by substantially 10% to 25%;

activating the inner surface of said intermediate blank by heating said blank to a temperature substantially in the range of 1450° C. to 1700° C.; and exposing said blank to a halogen gas at a temperature in the range of substantially 600° C. to 1100° C. to remove the metal from said intermediate blank to form a solid carbon skeleton network with a plurality of pores, and a plurality of transport channels.

13. The method of claim 12 further comprising the step of saturating said intermediate blank with liquid silicon wherein said pyrocarbon interacts with said liquid silicon to form a secondary structure throughout said blank, with free silicon filling cavities in said blank.

14. The method of claim 12 wherein said carbide material is selected from the group of metals consisting of Group IV, V, and VI of the periodic table.

15. The method of claim 12 wherein said carbide material is silicon carbide.

16. The method of claim 12 wherein said carbide material comprises silicon carbide fibers.

17. The method of claim 12 wherein said carbide material comprises silicon carbide particles.

18. The method of claim 12 wherein said carbide material comprises a mixture of silicon carbide particles and fibers.

19. The method of claim 12 wherein said carbide material comprises a mixture of carbon fibers and silicon carbide particles.

20. A method of manufacturing an electrode material comprising the steps of:

forming in the shape of said electrode, an intermediate blank made of a mixture of carbide particles and a binding agent, said blank having a porosity in the range of substantially 30% to 50% by volume;

impregnating said intermediate blank by exposure to natural gas at a temperature of approximately 900° C. until the mass of said intermediate blank increases by substantially 8% to 25%; and exposing said blank to chlorine gas at a temperature of approximately 600° C., wherein metal is removed from the blank leaving a solid carbon skeleton structure with a plurality of pores and a plurality of transport channels.

21. The method of claim 20 wherein said carbide particles comprise a mixture of particles such that 70% by weight of said particles have a size of approximately 40 microns, and 30% by weight of said particles have a size of approximately 3 microns.

22. The method of claim 20 wherein said binder comprises a 10% by weight solution of 10% phenolic resin and 90% $C_2H_5OH$.

23. The method of claim 20 wherein said electrode material has a total porosity of approximately 0.6 comprised from said pores having a porosity of approximately 0.33 and said transport channels having a porosity of approximately 0.27.

24. The method of claim 20 wherein said electrode material has a surface area of 700 $m^2/cm^3$.

* * * * *